US012736484B2

(12) United States Patent
Zhang et al.

(10) Patent No.: US 12,736,484 B2
(45) Date of Patent: Sep. 15, 2026

(54) CT IMAGING SYSTEM

(71) Applicant: NUCTECH COMPANY LIMITED, Beijing (CN)

(72) Inventors: Li Zhang, Beijing (CN); Zhiqiang Chen, Beijing (CN); Ming Chang, Beijing (CN); Xin Jin, Beijing (CN); Qingping Huang, Beijing (CN); Mingzhi Hong, Beijing (CN); Liguo Zhang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 173 days.

(21) Appl. No.: 18/699,360

(22) PCT Filed: Sep. 29, 2022

(86) PCT No.: PCT/CN2022/122477
§ 371 (c)(1),
(2) Date: Apr. 24, 2024

(87) PCT Pub. No.: WO2023/056881
PCT Pub. Date: Apr. 13, 2023

(65) Prior Publication Data

US 2024/0410839 A1 Dec. 12, 2024

(30) Foreign Application Priority Data

Oct. 8, 2021 (CN) .......................... 202111173186.7

(51) Int. Cl.
*G01N 23/046* (2018.01)

(52) U.S. Cl.
CPC ... *G01N 23/046* (2013.01); *G01N 2223/3307* (2013.01); *G01N 2223/419* (2013.01)

(58) Field of Classification Search
CPC ......... G01N 23/046; G01N 2223/3307; G01N 2223/419
See application file for complete search history.

(56) References Cited

U.S. PATENT DOCUMENTS 6,399,951 B1 * 6/2002 Paulus .................. A61B 6/508 250/363.04
7,177,391 B2 * 2/2007 Chapin .................... G01V 5/20 378/57

(Continued)

FOREIGN PATENT DOCUMENTS

CN 101315341 A 12/2008
CN 101400992 A * 4/2009 ............ G06T 7/187

(Continued)

OTHER PUBLICATIONS

Hermena et al, "CT-scan Image Production Procedures", National Institutes of Health, 2021, StarPearls Publishing; 1-10 (Year: 2021).*

(Continued)

*Primary Examiner* — Uzma Alam
*Assistant Examiner* — Fani Polyzos Boosalis
(74) *Attorney, Agent, or Firm* — Westman, Champlin & Koehler, P.A.

(57) ABSTRACT

A CT imaging system is provided, including: a scanning channel disposed in a first direction; a radiation source component disposed on one side of the scanning channel, wherein the radiation source component is used to emit radiation beams; a detector component disposed on another side of the scanning channel, wherein the detector component is disposed opposite to the radiation source component and used to receive the radiation beams, and the radiation beams forms an imaging region between the radiation source component and the detector component, wherein the detector component includes at least two detection regions and at least one blank region, the imaging region has a central (Continued)

cross-section of the radiation beams extending through the radiation source component, and a position of the detection region and a position of the blank region are complementary with respect to the central cross-section of the radiation beams.

8 Claims, 3 Drawing Sheets

(56) References Cited

U.S. PATENT DOCUMENTS

| | | | | |
|---|---|---|---|---|
| 7,529,336 | B2 | 5/2009 | Wen et al. | |
| 9,801,597 | B2 | 10/2017 | Bouhnik et al. | |
| 10,371,648 | B2 * | 8/2019 | Zhang | G01N 23/046 |
| 2003/0111610 | A1 | 6/2003 | Wagenaar et al. | |
| 2007/0116172 | A1 * | 5/2007 | Hsieh | A61B 6/032 378/8 |
| 2008/0298538 | A1 | 12/2008 | Wen et al. | |
| 2010/0215142 | A1 * | 8/2010 | Dafni | A61B 6/032 378/19 |
| 2013/0016805 | A1 * | 1/2013 | Silver | G01T 1/2985 250/363.03 |
| 2014/0146939 | A1 | 5/2014 | Zhang et al. | |
| 2016/0081641 | A1 | 3/2016 | Bouhnik et al. | |
| 2017/0367664 | A1 | 12/2017 | Xi et al. | |

FOREIGN PATENT DOCUMENTS

| | | | | |
|---|---|---|---|---|
| CN | 104545976 | A | 4/2015 | |
| CN | 104792805 | A | 7/2015 | |
| CN | 106483548 | A | 3/2017 | |
| CN | 106999128 | A | 8/2017 | |
| CN | 111281406 | A | 6/2020 | |
| CN | 113133772 | A | 7/2021 | |
| JP | 2007508561 | A | 4/2007 | |
| JP | 4-70015 | B2 | 4/2008 | |
| JP | 2013052232 | A | 3/2013 | |
| JP | 2015219239 | A | 12/2015 | |
| JP | 2018143574 | A | 9/2018 | |
| WO | WO-2007068933 | A1 * | 6/2007 | G06T 7/187 |

OTHER PUBLICATIONS

Translation of Office Action issued in corresponding Japanese Application No. 2024-520993, dated Mar. 18, 2025, 8 pages.

European Search Report issued in corresponding European application No. 22877900.5, dated Sep. 11, 2025, 9 pages.

* cited by examiner

CT IMAGING SYSTEM

CROSS-REFERENCE TO RELATED APPLICATION(S)

This application is a Section 371 National Stage Application of International Application No. PCT/CN2022/122477, filed on Sep. 29, 2022, entitled "CT IMAGING SYSTEM", which published as WIPO Publication No. 2023/056881 A1, on Apr. 13, 2023, not in English, which claims priority to Chinese Application No. 202111173186.7, filed on Oct. 8, 2021, the contents of which are incorporated herein by reference in their entireties.

TECHNICAL FIELD

The present disclosure relates to a field of a security inspection technology, and in particular, to a CT imaging system.

BACKGROUND

A size and an acquisition speed of a detector are mutually constrained. A high-resolution detector has a slow acquisition speed, and requires thousands of frames of data to be collected in a CT imaging system, thereby taking a long time to obtain complete data. A high-acquisition-speed detector has a smaller imaging region, which may not meet an imaging requirement of a large field of view.

SUMMARY

The present disclosure provides a CT imaging system, including: a scanning channel disposed in a first direction to allow an object to be inspected to pass into and out of the CT imaging system through the scanning channel: a radiation source component disposed on one side of the scanning channel, wherein the radiation source component is used to emit radiation beams; a detector component disposed on another side of the scanning channel, wherein the detector component is disposed opposite to the radiation source component and used to receive the radiation beams, and the radiation beams forms an imaging region between the radiation source component and the detector component, wherein the detector component includes at least two detection regions and at least one blank region, the imaging region has a central cross-section of the radiation beams extending through the radiation source component, and a position of the detection region and a position of the blank region are complementary with respect to the central cross-section of the radiation beams.

Further, one of the at least two detection regions is disposed on the axis of symmetry, and the other one of the at least two detection regions is disposed on one side of the one of the at least two detection regions.

Further, the one of the at least two detection regions is disposed at the central cross-section of the radiation beams and is evenly divided by the central cross-section of the radiation beams.

Further, the other one of the at least two detection regions is adjacent to the one of the at least two detection regions.

Further, the other one of the at least two detection regions is separated from the one of the at least two detection regions by the blank region.

Further, the detection region includes at least one detector, and a size of the blank region is not less than a size of a detector pixel.

Further, the CT imaging system has a first position where a radiation beam covers a first blank region and a second position where a radiation beam covers a first detection region, and image data output from the first position is the same as image data output from the second position.

Further, a plurality of rows of detector components are provided, and the plurality of rows of detector components are arranged in the first direction.

Further, the radiation beams includes a first emission angle and a second emission angle, and a range covered by the first emission angle and the second emission angle is an emission range of the radiation beams.

Further, the at least two detection regions are covered within the emission range.

Further, the CT imaging system further includes a carrying platform, wherein the carrying platform is slidably disposed on the scanning channel to allow the object to be inspected to pass into and out of the CT imaging system through the scanning channel.

Further, an adjusting platform is provided between the carrying platform and the object to be inspected, and the adjusting platform is used to adjust a posture of the object to be inspected.

Additional aspects and advantages of the present disclosure will be partially provided in the following descriptions, and will partially become apparent from the following descriptions, or will be understood by practice of the present disclosure.

BRIEF DESCRIPTION OF THE DRAWINGS

Other objectives and advantages of the present disclosure will be apparent through the following descriptions of the present disclosure with reference to accompanying drawings, which may help to have a comprehensive understanding of the present disclosure.

Figure 1:
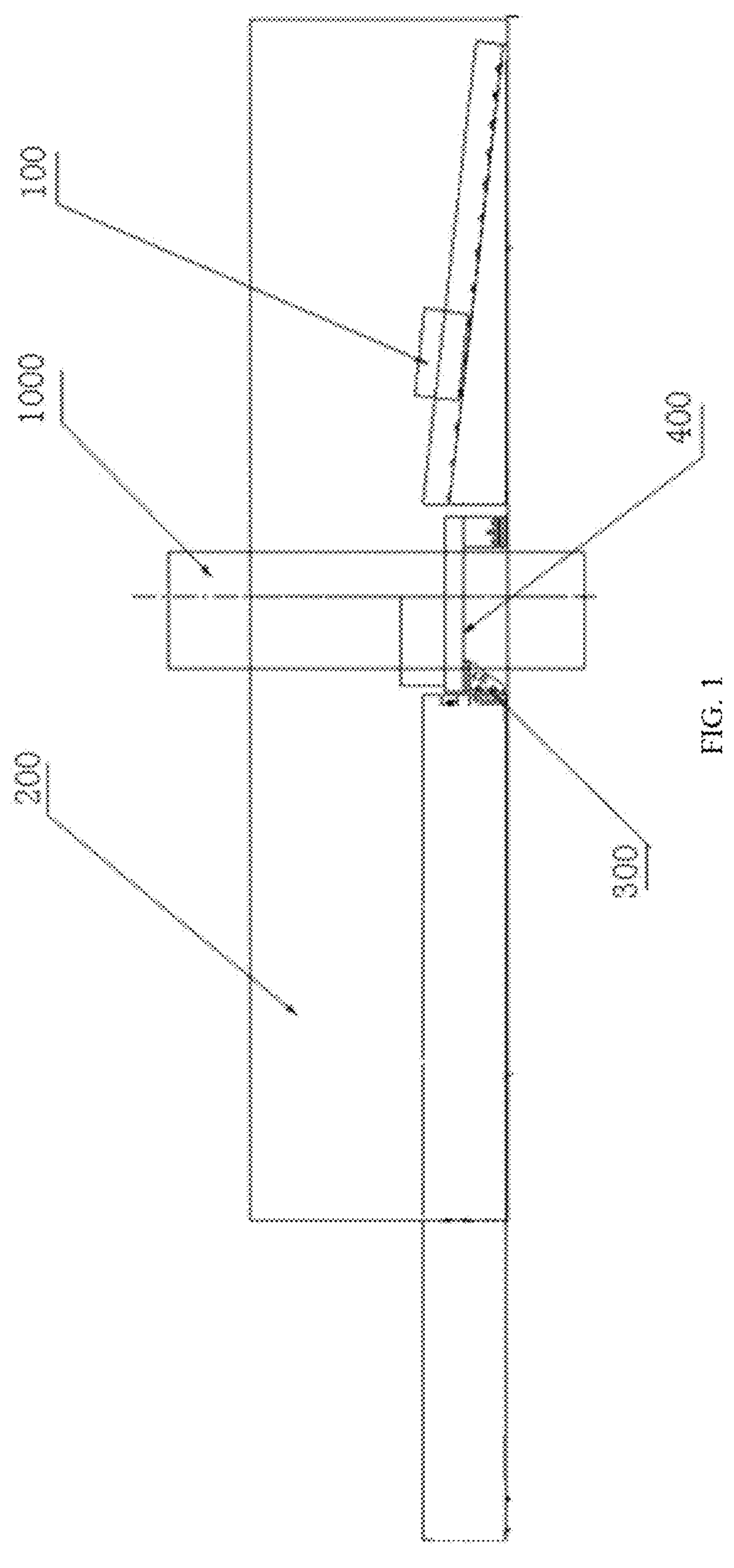
FIG. 1 shows an application scenario diagram of a CT imaging system according to embodiments of the present disclosure.

It should be noted that, for the sake of clarity, in the accompanying drawings used to describe embodiments of the present disclosure, a size of a structure or a region may be enlarged or reduced, that is, the accompanying drawings may not be drawn to actual scales.

REFERENCE SIGNS

CT imaging system 1000, object to be inspected 100, scanning channel 200, adjusting platform 300, carrying platform 400, radiation source component 10, detector component 20, detection region 21, first detection region 211, second detection region 212, blank region 22, first blank region 221, central cross-section of the radiation beams 31, first emission angle 32, second emission angle 33.

DETAILED DESCRIPTION OF EMBODIMENTS

In order to make objectives, technical solutions and advantages of the present disclosure clearer, the technical solution in embodiments of the present disclosure will be described clearly and completely in combination with accompanying drawings in embodiments of the present disclosure. Obviously, the described embodiments are some, but not all of embodiments of the present disclosure. Based on the described embodiments of the present disclosure, all other embodiments obtained by those skilled in the art without any creative work fall within the scope of protection of the present disclosure.

Unless otherwise defined, technical or scientific terms used in the present disclosure shall have ordinary meanings as understood by those skilled in the art to which the present disclosure belongs. As used in the present disclosure, "first," "second," and similar terms do not denote any order, quantity, or importance, but are merely used to distinguish different components. Words such as "including" or "comprising" indicate that the elements or objects listed before the word include the elements or objects listed after the word and equivalents thereof, and do not exclude other elements or objects.

In the present disclosure, unless otherwise specified, directional terms such as "up", "down", "left", "right", "inner", "outer", etc., are used to indicate orientations or positional relationships as shown in the accompanying drawings, which are only for the purpose of describing the present disclosure, and not to indicate or imply that the device, component, or part indicated must have a specific orientation, be constructed or operated in a specific orientation. It should be understood that when absolute positions of described objects change, relative positional relationships they represent may change accordingly. Therefore, these directional terms should not be construed as limiting the present disclosure.

In a CT imaging system, a radiation beam emitted from a radiation source, collimated and having a certain energy passes through an object to be examined, a detector receives different projected energies depending on different attenuation coefficients of each volume element in each transmission direction, and a scanning image is obtained after a series of signal transformations.

A size and an acquisition speed of the detector are mutually constrained. A high-resolution detector has a slow acquisition speed. For a large field of view imaging, a multi-segment scanning solution is used, which may require a plurality of scans of an object to be inspected, and thousands of frames of data are required be collected in the CT imaging system, thereby taking a long time to obtain complete data. A high-acquisition-speed detector has a smaller imaging region, which may not meet an imaging requirement of a large field of view.

In order to meet the requirement of a large field of view, a multi-row detector splicing solution is used currently. During a splicing arrangement, it is required to minimize a splicing gap between detectors as much as possible. Otherwise, a circular artifact may be generated due to data loss, thereby affecting an image quality. However, at present, an edge thickness of the high-resolution detector is much greater than a size of a detector pixel. Use of a direct splicing method may result in a large amount of data loss, and direct use of a whole detector may require a high requirement for a detector system, and even require a higher requirement for the detector's own field of view, transmission rate, resolution, etc., which is usually difficult to be achieved.

The present disclosure provides a CT imaging system 1000 that may achieve a large field of view, in which a high-resolution and small-sized detector is used, and complete CT data may be obtained through only one CT scanning, which may solve the above-mentioned problem.

It should be noted that embodiments of the present disclosure are applicable to application scenarios such as CT scanning, DR scanning, etc., without any limitation to a type of the scanning.

For example, in the CT scanning, a radiation beam emitted from a radiation source, collimated and having a certain energy passes through an object to be examined, and a detector receives different projected energies depending on different attenuation coefficients of each volume element in each transmission direction, and a scanning image is obtained after a series of signal transformations.

For example, in the DR scanning, CCD imaging is used, and X-ray irradiation is directly used for imaging processing to obtain an overlapping image of the object that an X-ray passes through in an irradiation direction.

A workpiece to be inspected in embodiments of the present disclosure may be a device to be inspected in various fields, such as an arrow body in an aerospace field or a pipeline in a pipeline device field, etc. The workpiece has specifically a cylindrical or nearly cylindrical structure. It may be understood that workpieces with other profile structures, such as a cubic structure, a vertebral body structure, etc., may also use the methods in the technology.

Embodiments of the present disclosure provide a CT imaging system, which may be used for a high-resolution radiation imaging, while meeting requirements of a large field of view and an acquisition speed, without a special restriction on a type of a detector, thereby expanding an application scope of an existing detector.

The CT imaging system 1000 according to embodiments of the present disclosure will be described below with reference to FIG. 1 to FIG. 4.

Figure 2:
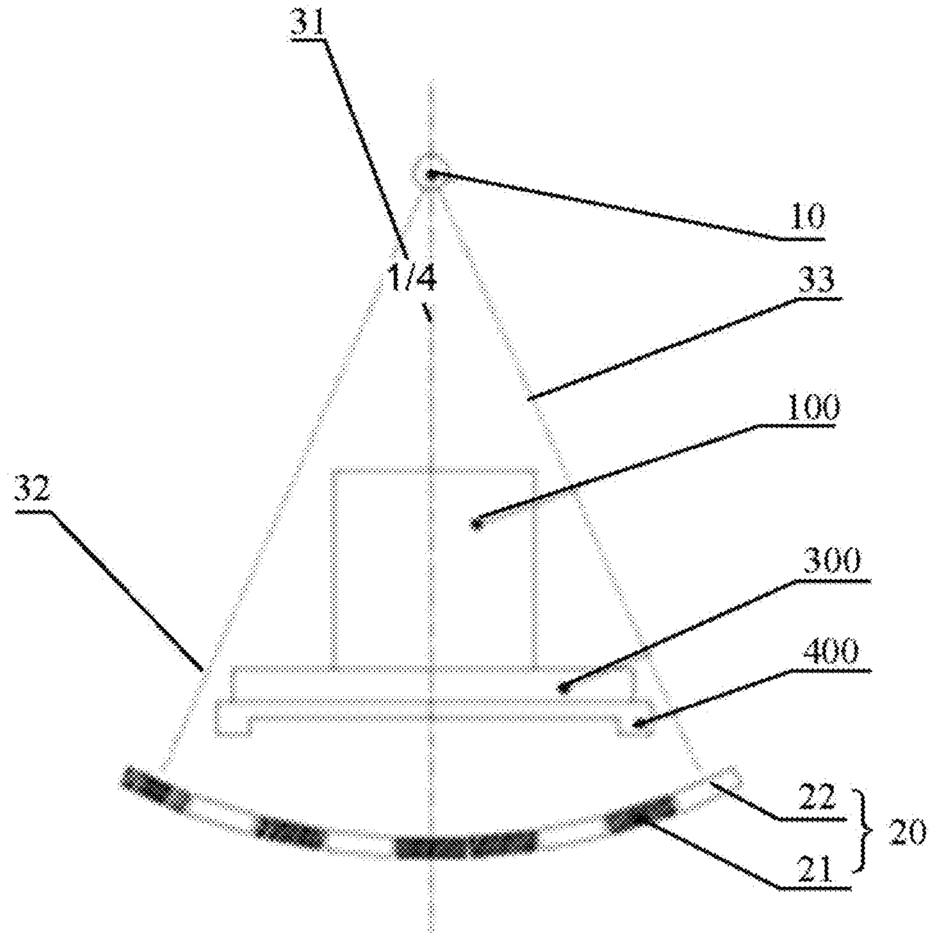
FIG. 2 shows a schematic structural diagram of a CT imaging system according to embodiments of the present disclosure.

As shown in FIG. 1 and FIG. 2, there is provided the CT imaging system 1000 of the present disclosure. The system is used to detect an internal structure of an object to be inspected 100. The system includes: a scanning channel 200, a radiation source component 10 disposed on one side of the scanning channel 200, and a detector component 20 disposed on another side of the scanning channel 200.

Specifically, the scanning channel 200 is arranged in a first direction to allow the object to be inspected 100 to pass into and out of the CT imaging system 1000 through the scanning channel 200. The radiation source component 10 is used to emit radiation beams, and the detector component 20 is disposed opposite to the radiation source component 10, and is used to receive the radiation beams.

The first direction may be understood as a conveying direction of the scanning channel 200, where the object to be inspected 100 is placed in the scanning channel 200 and passes into and out of the CT imaging system 1000 in the first direction. The radiation source component 10 and the detector component 20 are disposed on two sides of the scanning channel 200, respectively, and the radiation source component 10 and the detector component 20 are disposed opposite to each other at 180°.

A radiation generator is provided in the radiation source component 10, which is a core unit of the radiation source component 10. X-rays are generated through an excitation of the radiation generator, and may be used to detect the object to be inspected 100. A detector is provided in the detector component 20, which is used receive a radiation emitted by the radiation source and converting it into a digital signal, including: a detector panel, a power supply, a cable, a detector shielding device, etc.

The radiation beams form an imaging region between the radiation source component 10 and the detector component 20. A collimator is provided at an exit position of the radiation generator. After being emitted from the radiation generator, the X-rays need to pass through the collimator before being irradiated onto the object to be inspected 100. The collimator restricts an emission range of the X-rays to form the imaging region, by mainly shielding X-rays emitted in other directions and limiting the X-rays in a same plane.

The detector component 20 includes at least two detection regions 21 and at least one blank region 22. At least one detector is provided in each detection region 21.

In the present disclosure, in order to reduce the number of detectors, the detection region 21 and the blank region 22 are provided in the detector component 20. The detector is provided in the detection region 21, which may receive the radiation beams. Two adjacent detection regions 21 are spaced apart from each other, and the spacing region is not provided with a detector and therefore may not have a function of receiving the radiation beams. It may be understood that the region disposed between the two adjacent detection regions 21 is referred to as the blank region 22. Therefore, at least two detection regions 21 should be included in the detector component 20 to be spaced apart from each other to form the blank region 22.

In terms of field of view, since the detector component 20 has the detection regions 21 that are spaced apart from each other, at least two detection regions 21 may simultaneously receive the radiation beams, and therefore may have a function of a large field of view during imaging. In terms of cost, due to the presence of the blank region 22 in the detector component 20, the number of detectors used may be reduced, thereby reducing a cost of the CT imaging system 1000.

Certainly, each detection region 21 may include a plurality of detectors for receiving the radiation beams. Based on a total number of physical units of the detector, that is, detector pixels, a resolution of the detector is closely related to a size of the pixel. The smaller the pixel and the greater the number, the higher a resolution of the CT imaging system 1000 and the clearer the image.

The imaging region has a central cross-section of the radiation beams 31, which extends through the radiation source component 10. At least two detection regions 21 are asymmetrically distributed in a second direction with reference to the central cross-section of the radiation beams 31. The positions of the detection regions 21 and the blank region 22 are complementary with respect to the central cross-section of the radiation beams 31.

As shown in FIG. 2, a dashed line in the middle of the imaging region represents the central cross-section of the radiation beams 31. The detection regions 21 are asymmetrically distributed in the second direction with reference to the central cross-section of the radiation beams 31, that is, the detection regions 21 on two sides of the central cross-section of the radiation beams 31 are asymmetric. A distance between the position of a detection region 21 and the central cross-section of the radiation beams 31 is the same as a distance between the position of a blank region 22 and the central cross-section of the radiation beams 31, these two regions have a complementary relationship in space.

It should be noted that a range of a detection region 21 may be greater than or equal to a range of the blank region 22 corresponding to the detection region 21 in space with respect to the central cross-section of the radiation beams 31, that is, a length of the detection region 21 in the second direction may be greater than or equal to a length of the blank region 22 corresponding to the detection region 21 in space with respect to the central cross-section of the radiation beams 31 in the second direction. As a preferred solution, if the range of the detection region 21 is equal to the range of the blank region 22 corresponding to the detection region 21 in space with respect to the central cross-section of the radiation beams 31, the minimum number of detectors are required, which may greatly reduce the cost.

In a preferred embodiment, the CT imaging system 1000 includes a slip ring surrounding the scanning channel 200, and both the radiation source component 10 and the detector component 20 are disposed on the slip ring and arranged opposite to each other. After being driven by a drive motor, the slip ring may rotate around an axis of the scanning channel 200. That is to say, after the slip ring rotates, the radiation source component 10 and the detector component 20 rotate around the axis of the scanning channel 200 to detect different cross-sections of the object to be inspected 100.

According to the CT imaging system 1000 of the present disclosure, a plurality of high-resolution, small-size, and high-speed detectors are used. Since the detection regions 21 are asymmetrically distributed with respect to the central cross-section of the radiation beams 31, and the position of the detection region 21 and the position of the blank region 22 are complementary with respect to the central cross-section of the radiation beams 31, missing data may be obtained through algorithm compensation, by means of rotational scanning and based on data symmetry, so as to obtain complete data and to restore image information of the object to be inspected. The principle of obtaining missing data by means of rotation scanning will be further described in the following specific embodiments.

In a schematic embodiment of the present disclosure, one of the at least two detection regions 21 is disposed at the central cross-section of the radiation beams 31, and the other one of the at least two detection regions 21 is disposed on one side of the one of the at least two detection regions 21.

For example, the detector component 20 includes two detection regions and a blank region 22, where the central cross-section of the radiation beams 31 passes through one of the detection regions 21, the other detection region 21 is arranged on a right side of and spaced apart from the detection region 21 to form a blank region 22. The two detectors in the imaging region are arranged asymmetrically with respect to the central cross-section of the radiation beams 31.

By further subdividing an arrangement form of the detector component 20, the following two embodiments may be obtained.

Embodiment 1: One of the at least two detection regions 21 is disposed at the central cross-section of the radiation beams 31 and is evenly divided by the central cross-section of the radiation beams 31. The other one of the at least two detection regions 21 is adjacent to the one of the at least two detection regions 21.

In a plurality of detection regions 21 and a plurality of blank regions 22, the central cross-section of the radiation beams 31 passes through one of the detection regions 21, and the detection region 21 is evenly divided. The other detection region 21 is disposed adjacent to the right side of the detection region 21, which is equivalent to the two detection regions 21 being tightly spliced together. The two detectors in the imaging region are arranged asymmetrically with respect to the central cross-section of the radiation beams 31.

Embodiment 2: One of the at least two detection regions 21 is disposed at the central cross-section of the radiation beams 31 and is not evenly divided by the central cross-section of the radiation beams 31. The other one of the at least two detection regions 21 is separated from the one of the at least two detection regions 21 by the blank region 22.

In a plurality of detection regions 21 and a plurality of blank regions 22, the central cross-section of the radiation beams 31 passes through one of the detection regions 21. Detection regions on left and right sides of the detection region 21 through which the central cross-section of the radiation beams 31 passes have different sizes. The other detection region 21 is arranged on the right side of and spaced apart from the detection region 21 to form a blank region 22. The two detectors in the imaging region are arranged asymmetrically with respect to the central cross-section of the radiation beams 31.

Embodiment 3: One of the at least two detection regions 21 is disposed at the central cross-section of the radiation beams 31 and is not evenly divided by the central cross-section of the radiation beams 31. The other one of the at least two detection regions 21 is separated from the one of the at least two detection regions 21 by the blank region 22.

In a plurality of detection regions 21 and a plurality of blank regions 22, the central cross-section of the radiation beams 31 passes through one of the detection regions 21. Detection regions on left and right sides of the detection region 21 through which the central cross-section of the radiation beams 31 passes have different sizes. The other detection region 21 is closely adjacent to the right side of the detection region 21, which is equivalent to the two detection regions 21 being spliced together. The two detectors in the imaging region are arranged asymmetrically with respect to the central cross-section of the radiation beams 31.

It should be noted that the different sizes of the detection regions on the left and right sides of the detection region 21 through which the central cross-section of the radiation beams 31 passes in the above-mentioned embodiments refer to different physical sizes, i.e., different coverage areas.

According to an embodiment of the present disclosure, the detection region 21 includes at least one detector, and a size of the blank region 22 is not less than a size of a detector pixel.

The blank region 22 is formed by a spacing between two adjacent detection regions 21, and the size of the blank region 22 represents a distance between the two adjacent detection regions, and the distance is not less than a size of a detector pixel in the detection region 21. For example, if the size of the detector pixel in the detection region 21 is 0.1 mm×0.1 mm, the size of the blank region is not less than 0.1 mm.

According to an embodiment of the present disclosure, the CT imaging system 1000 has a first position where a radiation beam covers a first blank region 221 and a second position where a radiation beam covers a first detection region 211, and image data output from the first position is the same as image data output from the second position.

In order to further explain the principle of completing missing data through spatial complementarity in the present disclosure, two representative positions are listed in the CT imaging system 1000, that is, the first position where the first blank region 221 is covered and the second position where the radiation beam covers the first detection region 211.

Figure 3:
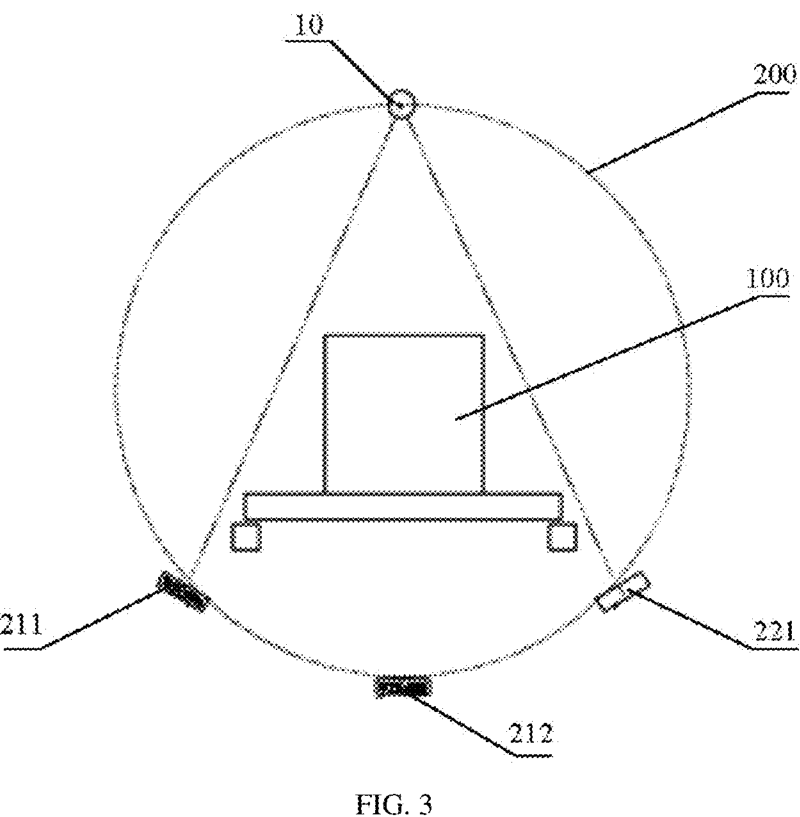
FIG. 3 shows a schematic structural diagram of a CT imaging system in a first position according to embodiments of the present disclosure.
Figure 4:
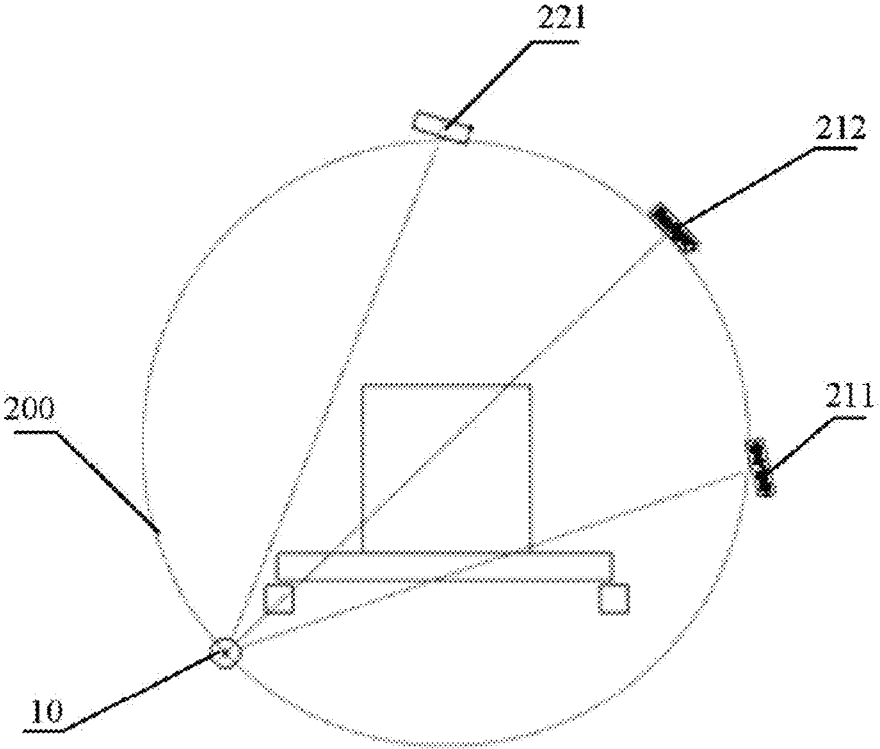
FIG. 4 shows a schematic structural diagram of a CT imaging system in a second position according to embodiments of the present disclosure.

It should be noted that, for ease of understanding, FIG. 3 and FIG. 4 show the blank region 22. The filled region is the detection region 21, and the blank region is the blank region 22. However, in practice, the blank region 22 is a position between two detection regions 21 where no detector is provided.

The first position of the CT imaging system 1000 is shown in FIG. 3. The radiation source component 10 emits radiation beams at the upper side of the scanning channel 200, and the detector component 20 receives the radiation beams at the lower side of the scanning channel 200. The detector component 20 consists of the first detection region 211, a second detection region 212, and the first blank region 221 from left to right. The radiation beams may cover the first detection region 211, the second detection region 212, and the first blank region 221.

In the first position, since both the first detection region 211 and the second detection region 212 are provided with detectors, imaging may be performed. Since no detector is provided in the first blank region 221, missing of data may occur here.

The second position of the CT imaging system 1000 is shown in FIG. 4, which is achieved by rotating counter-clockwise the CT imaging system 1000 from the first position to the second position. The radiation source component 10 emits the radiation beams from the lower left of the scanning channel 200, and the detector component 20 receives the radiation beams from the upper right of the scanning channel 200. The detector component 20 consists of the first detection region 211, the second detection region 212, and the first blank region 221 from bottom to top. The radiation beams may cover the first detection region 211, the second detection region 212, and the first blank region 221.

In the second position, since both the first detection region 211 and the second detection region 212 are provided with detectors, imaging may be performed. Since no detector is provided in the first blank region 221, missing of data may occur here.

Through comparison of the first position and the second position, it may be found that imaging data of the radiation source component 10 and the first detection region 211 in the first position is the same as imaging data of the radiation source component 10 and the first blank region 221 in the second position. Missing data of the first blank region 221 in the second position may be supplemented by the first detection region 211 in the first position, which may achieve data complementation and thus construct complete data required for the object to be inspected 100.

In the present disclosure, the spacing between the detection regions 21 is not limited. The spacing between every two adjacent detection regions 21 may all be unequal, or the spacing between every two adjacent detection regions 21 may be partially unequal, or the spacing between every two adjacent detection regions 21 may all be equal.

The term "spacing" here refers to a length distance between the two adjacent detection regions 21 in the second direction.

In an embodiment, the spacing between every two adjacent detection regions 21 is equal.

In order to facilitate the calculation of the number of detectors in the detector component 20 and arrangement of a position of each detector, the spacing between every two adjacent detection regions 21 is equal, that is, the length distance between every two adjacent detection regions 21 in the second direction is equal.

In the present disclosure, a coverage area of each detection region 21 is not limited. The coverage area of each detection region 21 may be totally different, or the coverage area of each detection region 21 may be partially different, or the coverage area of each detection region 21 may be the same.

The term "coverage area" here refers to a product of a length of each detection region 21 in the second direction and a length of each detection region 21 in a third direction. It should be noted that even if two detection regions 21 have the same coverage area, the two detection regions 21 may have different lengths in the second direction and different lengths in the third direction.

The third direction may be understood as a radius direction with the radiation source component 10 as a center, and the third direction is perpendicular to both the second direction and the first direction.

In an embodiment, the coverage area of the detection region 21 in the second direction is equal.

In order to facilitate the calculation of the number of detectors in the detector component 20 and arrangement of a position of each detector, the coverage area of each detection region 21 is equal, and the length of each detection region 21 in the second direction is equal.

According to an embodiment of the present disclosure, a plurality of rows of detector components 20 are provided, and the plurality of rows of the detector components 20 are arranged in the first direction.

Certainly, in the present disclosure, the number of rows of the detector components 20 is not limited. The plurality of rows of the detector component 20 in one of the above-mentioned embodiments may be installed in the first direction, which may be used in spiral CT scanning to save inspection time and improve work efficiency.

According to an embodiment of the present disclosure, the radiation beams include a first emission angle 32 and a second emission angle 33, and a range covered by the first emission angle 32 and the second emission angle 33 is an emission range of the radiation beams.

As shown in FIG. 2, in an imaging region formed by the radiation beams, a dashed line in the middle is the central cross-section of the radiation beams 31, an angle formed by a dashed line on the left and the central cross-section of the radiation beams 31 is the first emission angle 32, and an angle formed by a dashed line on the right and the central cross-section of the radiation beams 31 is the second emission angle 33. An emission range covered by the first emission angle 32 and an emission range covered by the second emission angle 33 together form the emission range of the radiation beams, which is also a field of view of the CT imaging system 1000 of the present disclosure. All images of the object to be inspected 100 may be obtained by rotating the CT imaging system 1000 once.

According to an embodiment of the present disclosure, at least two detection regions 21 are covered within the emission range.

In order to meet conditions of high resolution and high speed while imaging a large field of view, the emission range must cover at least two detection regions 21. That is, within the minimum emission range, the emission range must cover at least two detection regions 21 and a blank region 22 between the two detection regions 21. The presence of the blank region 22 within coverage of the emission range may reduce the number of detectors used, which may reduce a cost of the CT imaging system 1000. By using spatial complementarity, data of the blank region 22 may be obtained through two detection regions 21 during rotation scanning, thereby obtaining complete image data. The specific principle has been described in the above-mentioned descriptions and will not be repeated here.

According to an embodiment of the present disclosure, the CT imaging system 1000 further includes a carrying platform 400, and the carrying platform 400 may be slidably disposed on the scanning channel 200 to allow the object to be inspected 100 to pass into and out of the CT imaging system 1000 through the scanning channel 200.

The carrying platform 400 is connected to a screw, and the object to be inspected 100 is placed on the carrying platform 400. Under an action of a driving device, the carrying platform 400 may be driven by the screw, and the carrying platform 400 may push the object to be inspected 100 to move within the scanning channel 200. The screw accurately positions the object to be inspected 100 in the radiation beams of the CT imaging system 1000, which may effectively solve a problem of insufficient positioning accuracy of a transmission system of a detection device, and meet a requirement of some products for an image detection quality.

According to an embodiment of the present disclosure, an adjusting platform 300 is provided between the carrying platform 400 and the object to be inspected 100, and the adjusting platform 300 is used to adjust a posture of the object to be inspected 100.

The adjusting platform 300 of the present disclosure may adjust a motion posture of the object to be inspected 100 conveyed by a production line, and may also be used to adjust the object to be inspected 100 to a preset detection position in a field of radiation detection.

In the descriptions of this specification, reference terms "an embodiment", "some embodiments", "an example", "specific examples", or "some examples" means that specific features, structures, materials, or characteristics described in combination with the embodiment(s) or example(s) are included in at least one embodiment or example of the present disclosure. In this specification, illustrative descriptions of the above-mentioned terms do not necessarily refer to the same embodiment or example. In addition, the specific features, structures, materials, or characteristics described may be combined in any appropriate manner in one or more embodiments or examples.

Although some embodiments of the overall technical concept of the present disclosure have been shown and described, those skilled in the art will understand that changes may be made to these embodiments without departing from the principle and spirit of the overall technical concept of the present disclosure. The scope of the present disclosure is defined by the appended claims and their equivalents.

What is claimed is:

1. A CT imaging system, comprising:

a scanning channel disposed in a first direction to allow an object to be inspected to pass into and out of the CT imaging system through the scanning channel;

a radiation source component disposed on one side of the scanning channel, wherein the radiation source component is configured to emit radiation beams;

a detector component disposed on another side of the scanning channel, wherein the detector component is disposed opposite to the radiation source component and configured to receive the radiation beams, and the radiation beams forms an imaging region between the radiation source component and the detector component, wherein the detector component comprises at least two detection regions and at least one blank region, the imaging region has a central cross-section of the radiation beams extending through the radiation source component, and a position of the detection region and a position of the blank region are complementary with respect to the central cross-section of the radiation beams, wherein a coverage area of each detection region is equal, one of the at least two detection regions is disposed at the central cross-section of the radiation beams and is not evenly divided by the central cross-section of the radiation beams, and the other one of the at least two detection regions is separated from the one of the at least two detection regions by the blank region.

2. The CT imaging system according to claim 1, wherein the detection region comprises at least one detector, and a size of the blank region is not less than a size of a detector pixel.

3. The CT imaging system according to claim 1, wherein the CT imaging system has a first position where a radiation beam covers a first blank region and a second position where a radiation beam covers a first detection region, and image data output from the first position is the same as image data output from the second position.

4. The CT imaging system according to claim 1, wherein a plurality of rows of detector components are provided, and the plurality of rows of detector components are arranged in the first direction.

5. The CT imaging system according to claim 1, wherein the radiation beams comprises a first emission angle and a second emission angle, and a range covered by the first emission angle and the second emission angle is an emission range of the radiation beams.

6. The CT imaging system according to claim 5, wherein the at least two detection regions are covered within the emission range.

7. The CT imaging system according to claim 1, further comprising a carrying platform, wherein the carrying platform is slidably disposed on the scanning channel to allow the object to be inspected to pass into and out of the CT imaging system through the scanning channel.

8. The CT imaging system according to claim 7, wherein an adjusting platform is provided between the carrying platform and the object to be inspected, and the adjusting platform is configured to adjust a posture of the object to be inspected.

* * * * *